United States Patent [19]

Naitou et al.

[11] Patent Number: 5,573,253
[45] Date of Patent: Nov. 12, 1996

[54] PACKING RINGS, METHOD FOR PRODUCTION OF THE PACKING RINGS, AND SEAL DEVICE USING THE PACKING RINGS

[75] Inventors: Kazumasa Naitou; Shosuke Naito, both of Kitakoma-gun; Takahisa Ueda; Masaru Fujiwara, both of Sanda, all of Japan

[73] Assignees: Kitz Corporation, Chiba-ken; Nippon Pillar Packing Co., Ltd., Osaka-fu, both of Japan

[21] Appl. No.: 571,234

[22] Filed: Dec. 12, 1995

Related U.S. Application Data

[62] Division of Ser. No. 252,351, Jun. 3, 1991, Pat. No. 5,522,603.

[30] Foreign Application Priority Data

Jan. 31, 1994 [JP] Japan ...................................... 6-25937

[51] Int. Cl.$^6$ ...................................................... F16J 15/20
[52] U.S. Cl. ............................. 277/1; 277/204; 277/227; 264/29.5; 264/DIG. 67
[58] Field of Search ................................ 277/1, 102, 123, 277/125, 204, 227, 233, DIG. 6, 188 R, 188 A; 264/29.1, 29.5, 326, DIG. 67

[56] References Cited

U.S. PATENT DOCUMENTS

| | | | |
|---|---|---|---|
| 4,068,853 | 1/1978 | Schnitzler | 277/204 |
| 4,157,835 | 6/1979 | Kahle et al. | 277/DIG. 6 |
| 4,162,078 | 7/1979 | Cox | 277/102 |
| 4,190,257 | 2/1980 | Schnitzler | 277/102 |
| 4,256,317 | 3/1981 | Havens et al. | 277/DIG. 6 |
| 4,298,562 | 11/1981 | Latty | 264/DIG. 67 |
| 4,328,974 | 5/1982 | White et al. | 277/DIG. 6 |
| 4,350,346 | 9/1982 | Fowler | 277/188 A |
| 4,364,542 | 12/1982 | Meyer | 251/214 |
| 4,394,023 | 7/1983 | Hinojosa | 277/DIG. 6 |
| 4,455,334 | 6/1984 | Ogino et al. | 277/204 |
| 4,457,491 | 7/1984 | Dudman | 251/317 |
| 4,667,969 | 5/1987 | Suggs, III | 277/233 |
| 4,705,722 | 11/1987 | Ueda et al. | 277/230 |
| 4,826,181 | 5/1989 | Howard | 277/DIG. 6 |
| 4,892,320 | 1/1990 | Tückmantel | 277/204 |
| 4,934,657 | 6/1990 | Dodson | 277/102 |
| 4,961,988 | 10/1990 | Zhu | 428/229 |
| 5,050,298 | 9/1991 | Dodson | 277/204 |
| 5,134,030 | 7/1992 | Ueda et al. | 277/DIG. 6 |
| 5,135,240 | 8/1992 | Dodson | 277/188 A |
| 5,188,376 | 2/1993 | Ueda et al. | 277/227 |
| 5,228,701 | 7/1993 | Greinke et al. | 277/227 |

FOREIGN PATENT DOCUMENTS

| | | | |
|---|---|---|---|
| 2576999 | 8/1986 | France | 277/204 |
| 1-29315 | 9/1989 | Japan . | |

*Primary Examiner*—William A. Cuchlinski, Jr.
*Assistant Examiner*—John L. Beres
*Attorney, Agent, or Firm*—Wenderoth, Lind & Ponack

[57] ABSTRACT

A packing ring of a composite structure including a packing of expanded graphite and an annular mass of superposed sheets of expanded graphite is produced by a method including the steps of spirally winding a ribbon of expanded graphite into a roll, compression molding the roll into the packing, and incorporating the annular mass into the packing by compression molding within a molding die so that at least one packed part has a higher density than the packing in at least one of the inner and outer peripheral parts of the packing. A seal device has an empty space through which passes a shaft and containing at least one such packing in the empty space to seal between the inner wall of the empty space and the outer peripheral surface of the shaft.

1 Claim, 8 Drawing Sheets

PACKING RINGS, METHOD FOR PRODUCTION OF THE PACKING RINGS, AND SEAL DEVICE USING THE PACKING RINGS

This is a divisional application of Ser. No. 08/252,351, filed Jun. 3, 1994, now U.S. Pat. No. 5,522,603.

BACKGROUND OF THE INVENTION

1. Field of the Invention

This invention relates to packing rings, a method for the production of a packing ring.

2. Description of the Prior Art

Packing rings can be used extensively as seal members in parts prone mainly to rotary or reciprocating sliding motions or as seal members in stationary parts. For example, they can be used in a seal device to be interposed between the body or bonnet and the stem of a valve or in a seal device for fluid-handling devices and to be incorporated in a pump shaft sealing part, etc. Examples of the fluids for which the packing rings are effectively used include gases, liquids and loose solid materials. Particularly in recent years, the free emission of fluids from fluid-handling devices has posed a serious problem from the standpoint of preservation of the earth's environment. From this point of view, there is a great demand for developing packing rings which excel in heat resistance and chemical resistance as well as in fast sealing properties.

Known packing rings are generally are of two types. Those of one type are produced by cutting a ribbon from a sheet of expanded graphite, winding the ribbon into a spiral roll and compression molding the roll annularly in a die, and those of the other type are produced by laminating a plurality of sheets of expanded graphite and punching a ring of prescribed dimensions out of the resultant lamination.

The packing rings of the two types are inserted in an empty space adapted for accommodation thereof and then compressed therein prior to use.

In the case of the packing rings of the former type, since they easily deform laterally, namely in the radial direction, under the force of the compression, they gain in force of contact with a stuffing box or a shaft and consequently manifest a sufficient sealing function even when the stuffing box or shaft lacks the or when surfaces thereof are machined inaccurately. However, such satisfactory sealing function tends to decline with the elapse of time because the packing rings easily protrude through gaps such as occur between the bottom surface of the stuffing box and the shaft, between the gland retainer and the shaft and between the gland retainer and the empty space of the stuffing box, and consequently entails a loss in the force of compression.

Further, since the fastness of adhesion between the layers of the laminated sheet material forming the packing rings is rather degraded than exalted by the force of the compression exerted on the packing rings, the fluid being handled is liable to permeate the packing rings in the axial direction. Besides, the surfaces of the packing rings which contact other packing rings, the bottom surface of the stuffing box, or the retaining surface of the gland retainer are formed of the end faces of the sheet material which forms the packing ring. Thus, the packing rings betray poor fastness of adhesion on the surfaces in question and tend to get wet, and the surfaces themselves tend to sustain injury and demand delicate handling.

In the case of the packing rings of the latter type, such packing rings do not gain very much in force of contact with the stuffing box or the shaft because the ratio at which the packing rings are deformed laterally, namely in the radial direction, under the force of the compression is very small. When the stuffing box or the shaft lacks dimensional accuracy or when surfaces thereof are machined in accurately, therefore, the packing rings tend to entail leakage of the fluid because of poor fastness of adhesion. Fortunately, these packing rings preclude the permeation of fluid therethrough in the axial direction under the force of compression, manifest satisfactory fastness of adhesion thereof to the bottom surface of the stuffing box or to the retaining surface of the gland retainer, and permit no ready leakage of fluid through the interfaces. Further, these packing rings do not very often protrude through the empty space for accommodating the packing rings, namely through the gap between the bottom part of the stuffing box and the shaft, the gap between the gland retainer and the shaft and the gap between the gland retainer and the stuffing box. The possibility that the packing rings will protrude to the extent of degrading the force of compression and sacrificing the sealing function is remote.

These packing rings are at a disadvantage in entailing easy vertical separation between the layers of laminated sheet material, readily sustaining injury, demanding delicate handling, and requiring substantial and labor for maintenance.

Figure 18:
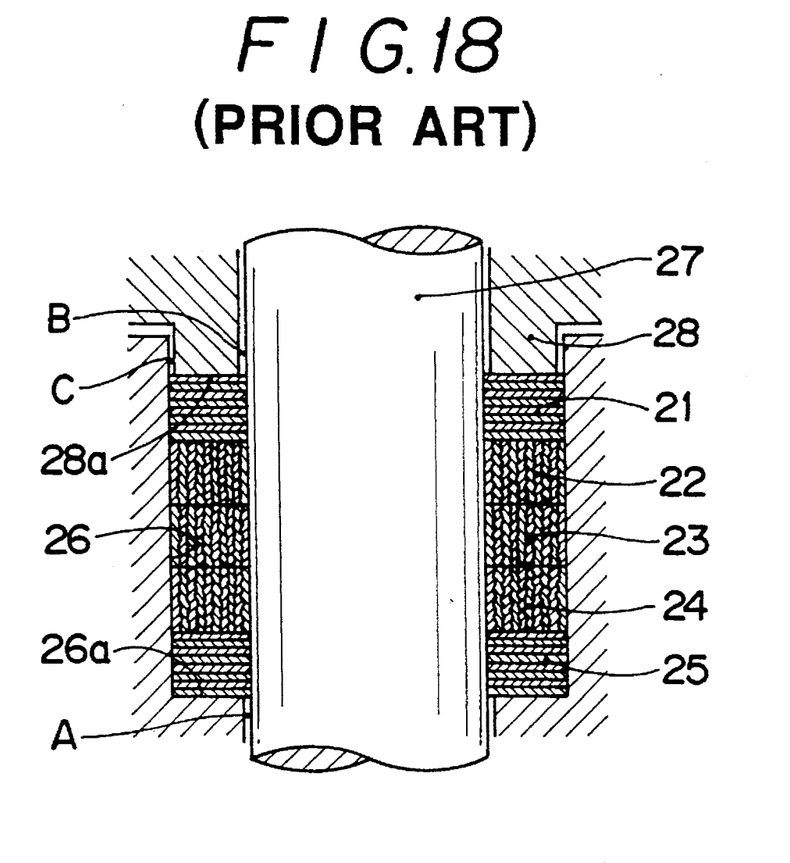
FIG. 18 is a partial cross section illustrating one example of the prior art seal device.

FIG. 18 is a partial longitudinal cross section illustrating a seal device which is disclosed in Japanese Utility Model Publication No. 1-29315. This seal device has been proposed for the purpose of utilizing packing rings of expanded graphite produced by the two methods described above while eliminating the drawbacks thereof and harnessing the advantages thereof.

In FIG. 18, reference numerals 21 to 25 refer to packing rings of expanded graphite, specifically numerals 21 and 25 each represent a packing ring produced by the latter of the two methods and numerals 22, 23 and 24 each represent a packing ring produced by the former method. Reference numeral 26 refer to a stuffing box, numeral 27 a stem, and numeral 28 a gland retainer.

As illustrated in FIG. 18, the packing rings 21 to 25 are compressed with the gland retainer 28 inside the stuffing box 26. As a result, the packing rings 22, 23 and 24 produced by the former method are deformed in the radial direction and brought into tight contact with the stuffing box 26 and the stem 27 to preclude the otherwise possible leakage of fluid along the interfaces of the contact.

The packing rings 21 and 25, in the meanwhile, prevent leakage therethrough of the fluid which has permeated through the packing rings 22, 23 and 24 in the axial direction. Further, the packing rings 21 and 25 prevent leakage therethrough of the fluid which has flowed through the interfaces thereof with the packing ring 22 or 24, a bottom surface 26a of the stuffing box 26, and a retaining surface 28a of the gland retainer 28. Since the packing rings 21 and 25 are superposed in a direction which is perpendicular to the gap A between the bottom part of the stuffing box 26 and the stem 27, the gap B between the gland retainer 28 and the stem 27 and the gap C between the gland retainer 28 and the stuffing box 26, they protrude through these gaps very rarely.

Even in the seal device which is constructed as illustrated in FIG. 18, however, the packing rings 21 through 25 tend to sustain injury and demand delicate handling. Particularly the packing rings 21 and 25 easily separate vertically from the intervening packing rings 22 to 24 and render the maintenance thereof difficult. Though they protrude through the aforementioned gaps A, B and C only slightly, such protrusion nevertheless remains a problem. Moreover, this seal device is at a disadvantage in insufficiently preventing leakage therethrough of a gas of small molecular weight or a solvent of strong osmosis.

A object of the present invention is to provide a method of producing packing rings of expanded graphite that have excellent heat resistance and chemical resistance and that nevertheless eliminate the drawbacks inherent in the conventional packing rings.

SUMMARY OF THE INVENTION

To accomplish the object described above, according to the invention there is provided a packing ring of a composite structure comprising a packing obtained by spirally winding a ribbon of expanded graphite into a roll and compression molding the roll, and an annular mass of superposed sheets of expanded graphite incorporated into the packing by compression molding so as to give rise to at least one packed part having a higher density than the packing in at least one of an inner peripheral part and an outer peripheral part of the packing. A method for the production of such a packing ring includes the steps of spirally winding a ribbon of expanded graphite into a roll, compression molding the roll into a packing, disposing an annular mass of superposed sheets of expanded graphite at a position in the packing, and compression molding a resultant composite within a molding die so as to give rise to at least one packed part having a higher density than the packing in at least one of an inner peripheral part and an outer peripheral part of the packing. A seal device has an empty space through which a shaft passes and contains at least one packing ring in the empty space in a compressed fashion to seal between an inner wall of the empty space and an outer peripheral surface of the shaft. The at least one packing ring includes a packing obtained by spirally winding a ribbon of expanded graphite into a roll and compression molding the roll, and an annular mass of superposed sheets of expanded graphite incorporated into the packing by compression molding so that at least one packed part has a higher density than the packing in at least one of an inner peripheral part and an outer peripheral part of the packing.

The above and other objects, features and advantages of this invention will become apparent to those skilled in the art from the description of the invention given in detail hereinbelow with reference to the accompanying drawings.

DETAILED DESCRIPTION OF THE PREFERRED EMBODIMENTS

The present invention will now be described in detail with reference to the illustrated embodiments.

FIGS. 1 to 10 are halved perspective views illustrating examples of the packing ring produced according to the present invention, and FIGS. 11 to 14 are sectioned explanatory views of the packing rings shown in FIGS. 1 to 4, respectively.

In FIGS. 1 to 4, reference numeral 2 designates a packing ring. Though this packing ring 2 is an endless ring, a cord-like packing adapted to be inserted in the shape of a ring in an empty space for accommodation of a packing ring may be used instead. The packing ring 2 comprises a packing 3 formed by spirally winding a ribbon of expanded graphite into a roll and compression molding the roll, and an annular mass 4 of superposed sheets of expanded graphite. The annular mass 4 has an inside diameter larger than the inside diameter of the packing 3 and/or has an outside diameter smaller than the outside diameter of the packing 3. The packing rings 2 shown in FIGS. 1 to 14 are invariably in a composite structure having one or two annular masses 4 incorporated in the packing 3. In all of the packing rings 2, the packing 3 is extended to either one or both of the inner peripheral part 4a and the outer peripheral part 4b of the annular mass 4. In other words, the packing 3 is driven into at least one of the inner and outer peripheral parts 4a and 4b of the annular mass 4 to give rise to a packed part 10 of a density higher than that of the packing 3. The packed part 10 is formed in a portion of the packing 3 resulting from the difference in diameter between the annular mass 4 and the packing 3.

In all the packing rings 2, the packings 3 formed by spirally winding a ribbon of expanded graphite into a roll and compression molding the roll invariably have a density in the range of 0.7 to 1.9 g/cc, preferably in the range of 1.0 to 1.5 g/cc (1.3 g/cc, for example) and the annular masses 4 of superposed sheets of expanded graphite have a density in the range of 0.7 to 1.9 g/cc, preferably less than that of the packings 3.

These packing rings 2 are invariably produced by spirally winding a ribbon of expanded graphite into a roll, compression molding the roll into a packing 3 having a predetermined inside diameter and a predetermined outside diameter, disposing at least one annular mass 4 of superposed sheets of expanded graphite having a larger inside diameter than the packing 3 and/or having a smaller outside diameter than the packing 3 at a given position or positions in the packing 3, and compression molding the resultant composite within a molding die (not shown) so as to give rise to a packed part 10 of a density higher than that of the packing 3 in a portion of the packing 3 resulting from the difference in diameter between the annular mass 4 and the packing 3.

Figure 5:
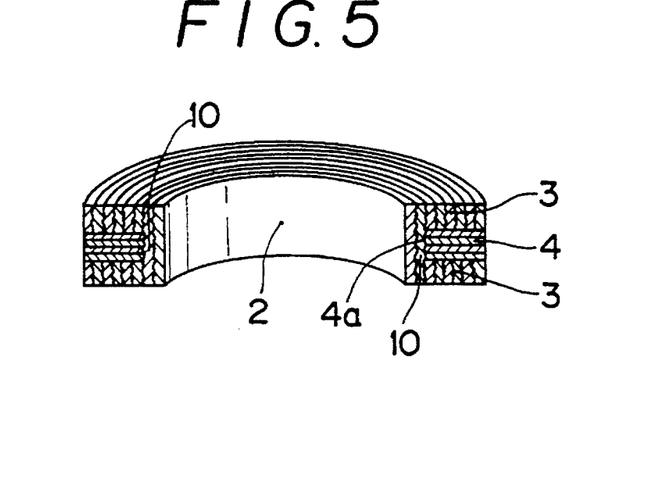
FIG. 5 is a halved perspective view illustrating a further example of the packing ring produced according to this invention.
Figure 6:
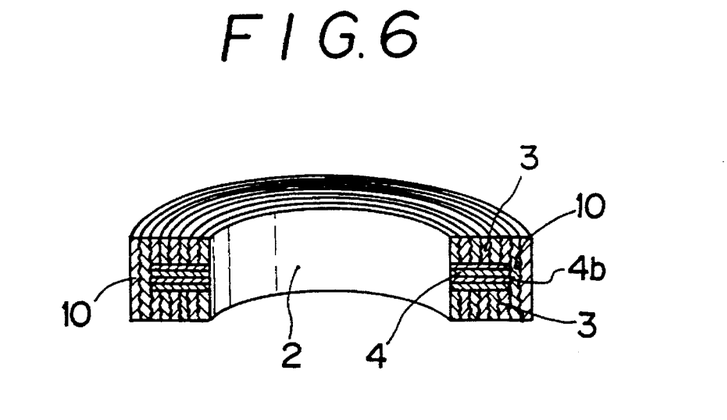
FIG. 6 is a halved perspective view illustrating another example of the packing ring produced according to this invention.
Figure 7:
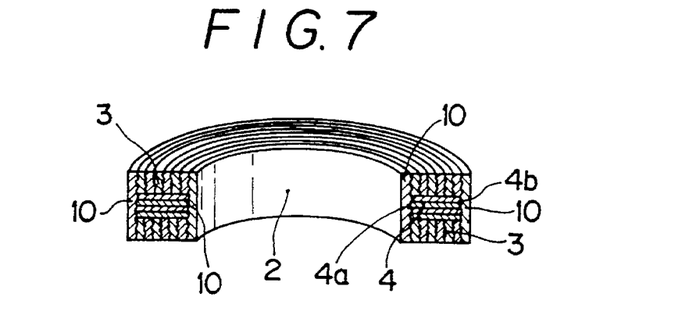
FIG. 7 is a halved perspective view illustrating still another example of the packing ring produced according to this invention.
Figure 8:
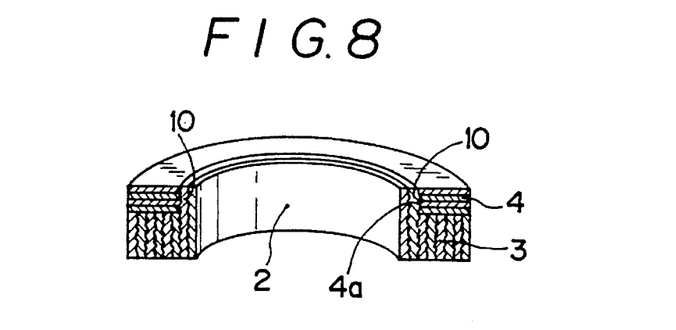
FIG. 8 is a halved perspective view illustrating yet another example of the packing ring produced according to this invention.
Figure 9:
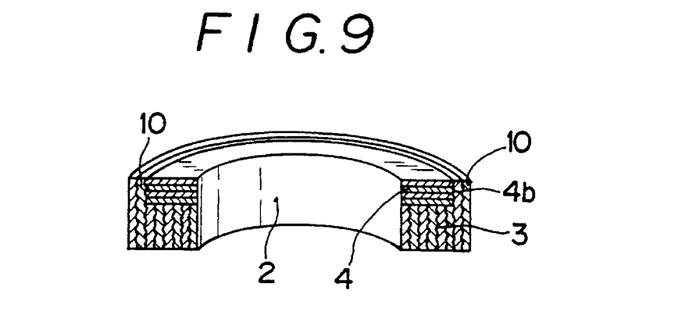
FIG. 9 is a halved perspective view illustrating a further example of the packing ring produced according to this invention.
Figure 10:
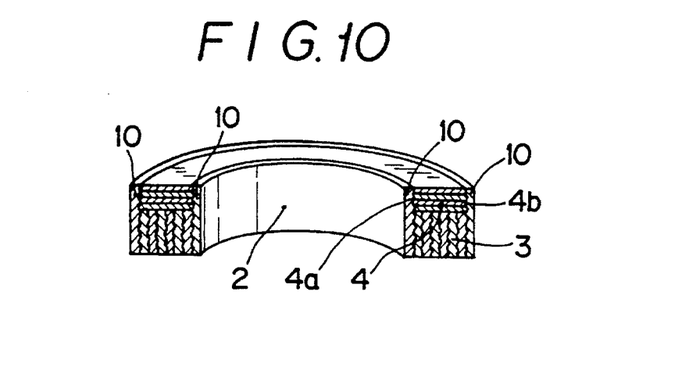
FIG. 10 is a halved perspective view illustrating another example of the packing ring produced according to this invention.

The packing rings 2 shown in FIGS. 1 to 4 have two annular masses 4 of superposed sheets of expanded graphite incorporated one each in the upper and lower surfaces of a packing 3, the packing rings 2 shown in FIGS. 5 to 7 have such a mass 4 incorporated in the intermediate part of the packing 3 in the direction of its thickness, and the packing rings 2 shown in FIGS. 8 to 10 have such a mass 4 incorporated in either the upper surface or the lower surface of the packing 3.

It is desirable to dispose an annular mass 4 of superposed sheets of expanded graphite on the inner peripheral part, the outer peripheral part, or each of both the inner and outer peripheral parts of a packing 3 formed by spirally winding a ribbon of expanded graphite into a roll and compression molding the roll so as to give rise to a packed part 10 of a higher density in the relevant area.

Figure 1:
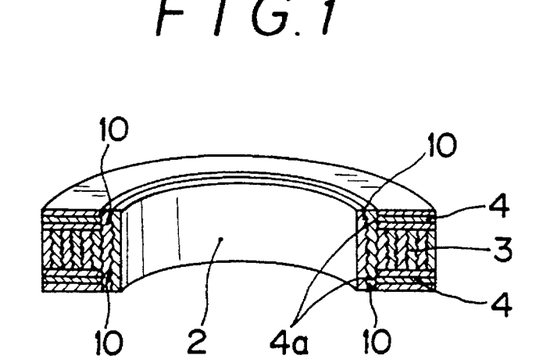
FIG. 1 is a halved perspective view illustrating one example of the packing ring produced according to this invention.

To be specific, the packing ring shown in FIG. 1 has a construction such that each of the annular masses 4 extends to the outer peripheral part of the packing 3, thereby giving rise to packed parts 10 of a density higher than that of the packing 3 in the relevant areas on the side of the inner peripheral part of the packing 3. The packing ring shown in FIG. 2 has a construction such that each of the annular masses 4 extends to the inner peripheral part, thereby giving rise to packed parts 10 of a density higher than that of the packing 3 in the relevant areas on the side of the outer peripheral part of the packing 3. The packing ring shown in FIG. 3 has a construction such that one of the annular masses 4 extends to the outer peripheral part of the packing 3 and that the other annular mass 4 extends to the inner peripheral part of the packing 3, thereby giving rise to packed parts 10 having a higher density than the packing 3 in the relevant areas, one on the side of the inner peripheral part of the packing 3 and the other on the side of the outer peripheral part of the packing 3. The packing ring shown in FIG. 4 has a construction such that each of the annular masses 4 extends to portions immediately before the inner and outer peripheral parts of the packing 3 so as to give rise to packed parts 10 having a higher density than the packing 3 in the relevant areas on both sides of the inner and outer peripheral parts of the upper and lower surfaces of the packing 3. These configurations of the packing rings shown in FIGS. 1 to 4 will be further understood from FIGS. 11 to 14, respectively.

The packing ring shown in FIG. 5 has a construction such that the mass 4 extends to the outer peripheral part of the packing 3, thereby giving rise to a packed part 10 of a density higher than that of the packing 3 in the relevant area on the side of the inner peripheral part of the packing 4. The packing ring 2 shown in FIG. 6 has a construction such that the mass 4 extends to the inner peripheral part of the packing 3, thereby giving rise to a packed part 10 of a density higher than that of the packing 3 in the relevant area on the side of the outer peripheral part of the packing 3. The packing ring shown in FIG. 7 has a construction such that the mass 4 extends immediately before the inner and outer peripheral parts of the packing 3, thereby giving rise to packed parts 10 of a density higher than that of the packing 3 in the relevant areas on both sides of the inner and outer peripheral parts of the packing 3.

The packing ring shown in FIG. 8 has a construction such that the mass 4 extends to the outer peripheral parts of the packing 3, thereby giving rise to a packed part 10 of a density higher than that of the packing 3 in the relevant area on the side of the inner peripheral part of the packing 3. The packing ring illustrated in FIG. 9 has a construction such that the mass 4 extends to the inner peripheral part of the packing 3, thereby giving rise to a packed part 10 having of a density higher than the packing 3 in the relevant area on the side of the outer peripheral part of the packing 3. The packing ring shown in FIG. 10 has a construction such that the mass 4 extends immediately before the inner and outer peripheral parts of the packing 3, thereby giving rise to packed parts 10 of a density higher than that of the packing 3 in the relevant areas on both sides of the inner and outer peripheral parts of the packing 3.

Any of the measures mentioned above proves advantageous for the sake of this invention.

Figure 15:
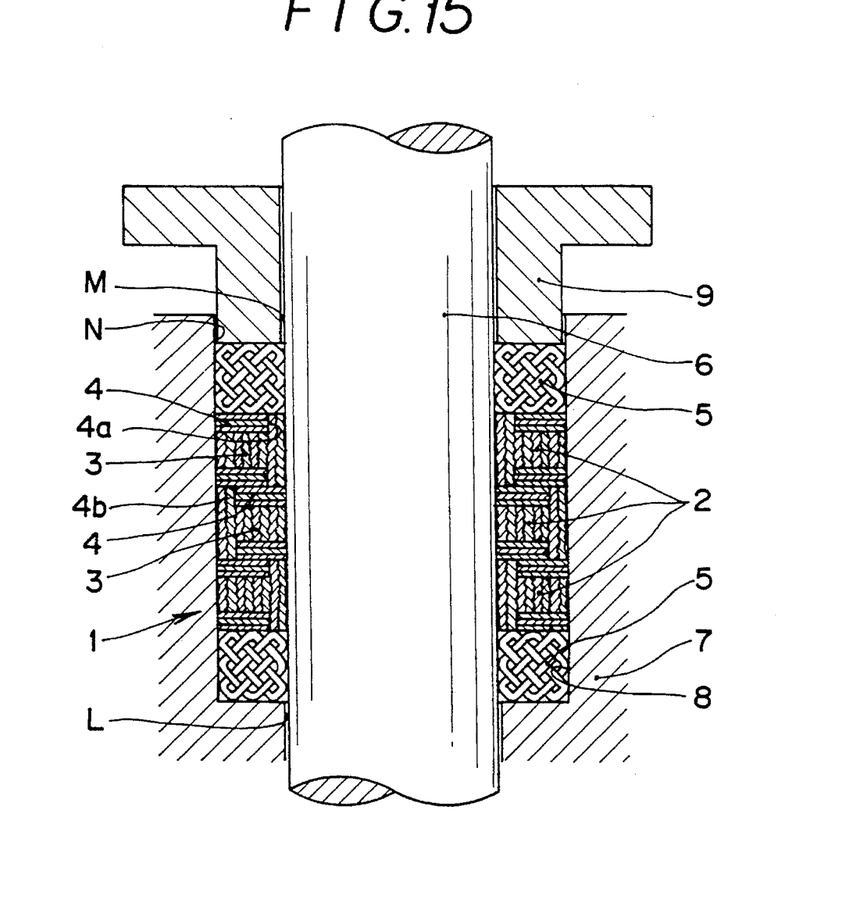
FIG. 15 is a partial cross section illustrating one example of the seal device enabled according to this invention.
Figure 16:
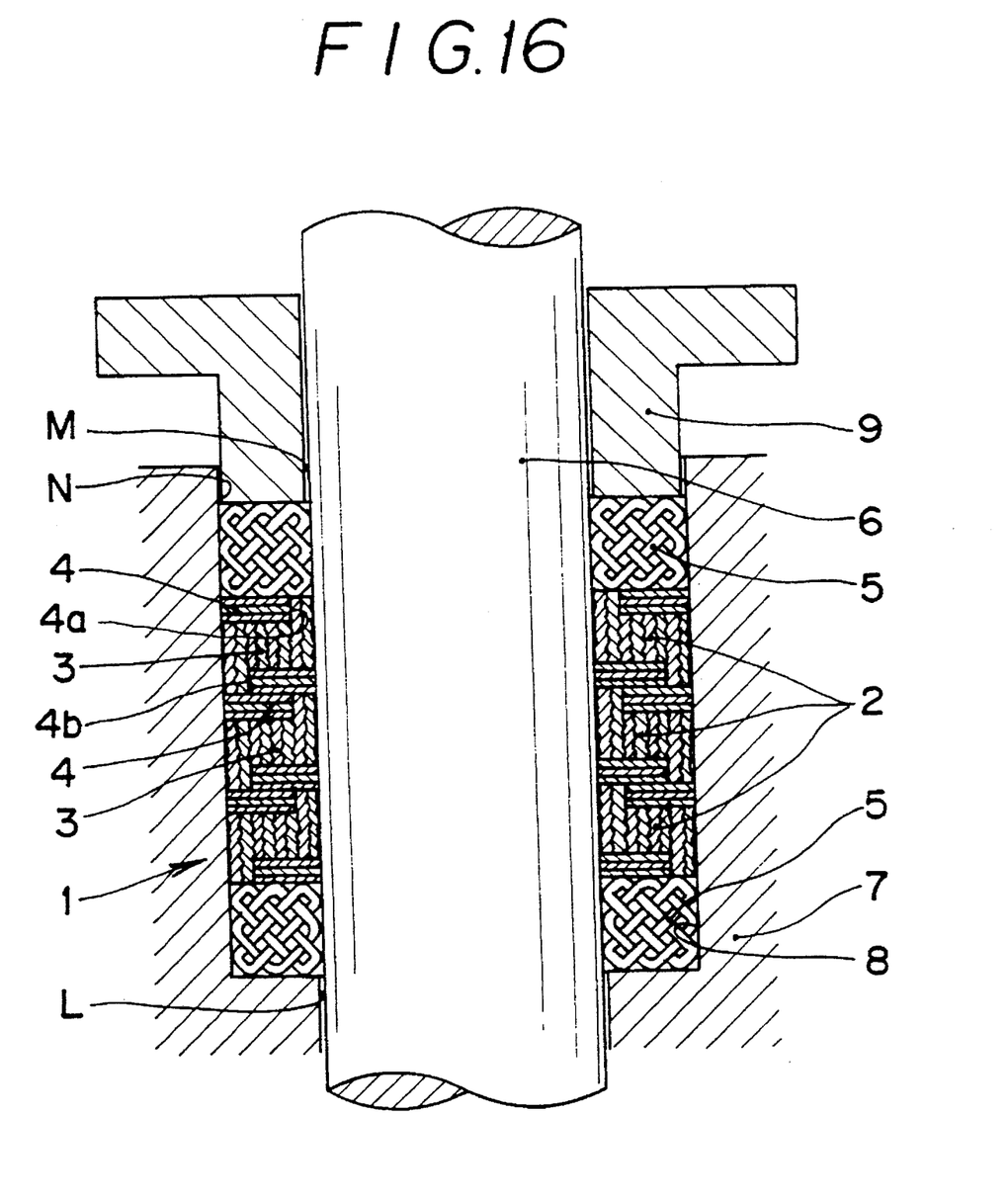
FIG. 16 is a partial cross section illustrating another example of the seal device enabled according to this invention.

FIGS. 15 and 16 are partial cross sections showing examples of the seal device according to this invention. In these Figures, reference numeral 1 designates a seal device.

Figure 2:
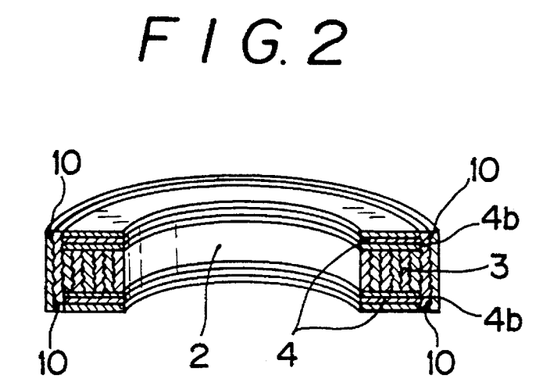
FIG. 2 is a halved perspective view illustrating another example of the packing ring produced according to this invention.
Figure 11:
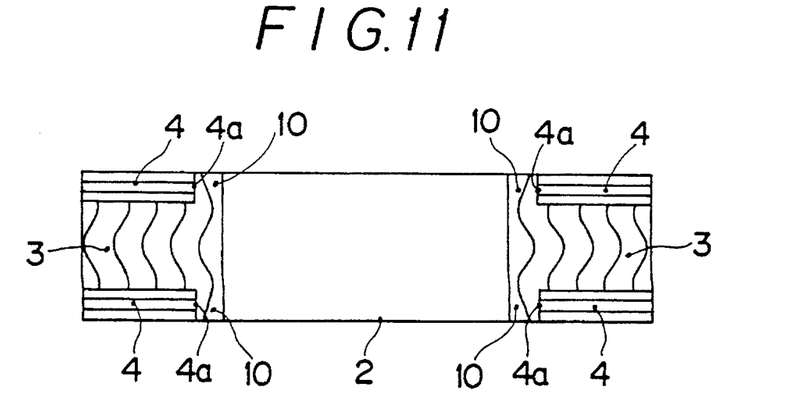
FIG. 11 is a sectioned explanatory view of the packing ring shown in FIG. 1.
Figure 12:
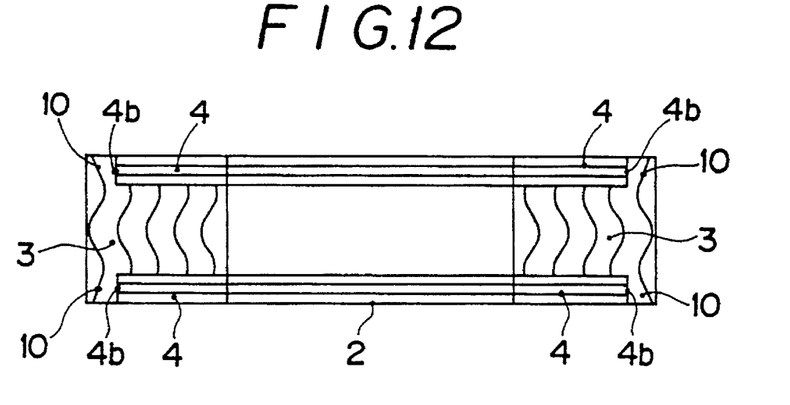
FIG. 12 is a sectioned explanatory view of the packing ring shown in FIG. 2.

In the seal device 1 shown in FIG. 15, a packing ring 2 shown in FIGS. 2 or 12 is sandwiched between two packing rings 2 shown in FIGS. 1 or 11, and the three superposed packing rings 2 are sandwiched between two braided packing rings 5 formed by braiding a knitting yarn made of carbon fibers or expanded graphite. The plurality of superposed packing rings 2 and 5 are inserted into a stuffing box 8, i.e. an empty space adapted for accommodation thereof. In each seal device 1 thus constructed, the braided packing ring 5 is enabled to manifest the function of wiper rings.

Figure 3:
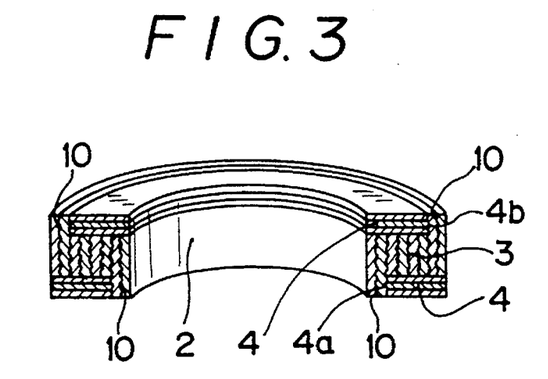
FIG. 3 is a halved perspective view illustrating still another example of the packing ring produced according to this invention.
Figure 4:
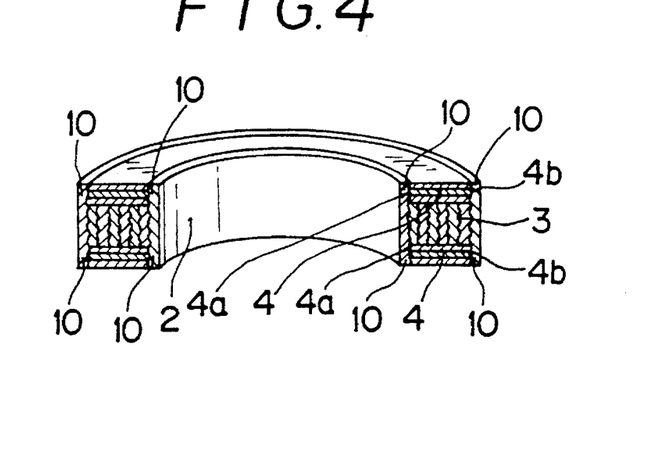
FIG. 4 is a halved perspective view illustrating yet another example of the packing ring produced according to this invention.
Figure 13:
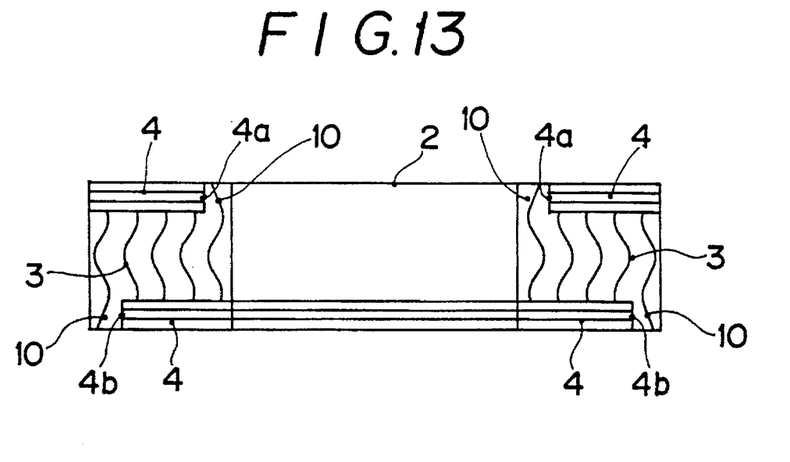
FIG. 13 is a sectioned explanatory view of the packing ring shown in FIG. 3.
Figure 14:
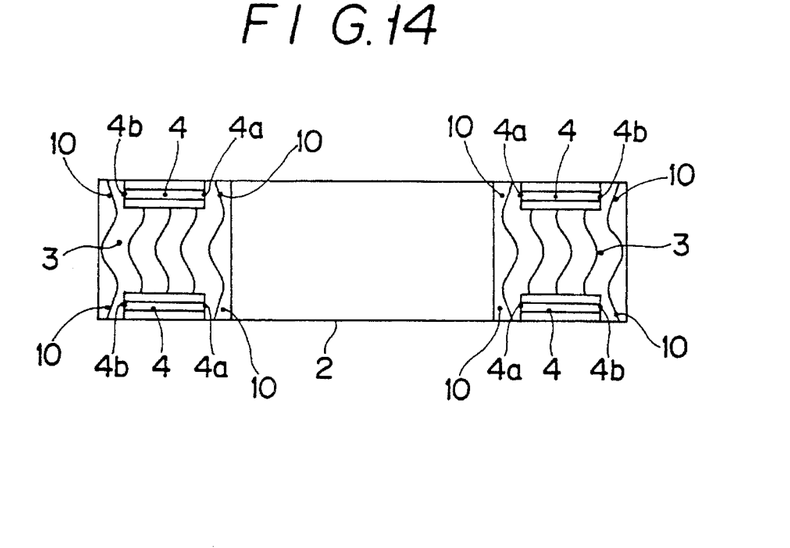
FIG. 14 is a sectioned explanatory view of the packing ring shown in FIG. 4.

In the seal device 1 illustrated in FIG. 16, three packing rings 2 shown in FIGS. 3 or 13 are superposed one on top of another and are sandwiched between two braided packing rings 5 formed by braiding a knitting yarn of expanded graphite. The plurality of superposed packing rings 2 and 5 are inserted into a stuffing box 8, i.e. an empty space adapted for accommodation thereof. In this case, the braided packing rings 5 are also enabled to manifest the function of wiper rings. The seal device 1 thus constructed encounters no maintenance difficulties because the packing rings 2 of the same composite construction are not erroneously incorporated into the seal device 1 during the assembly of the seal device 1.

The seal device 1 illustrated in FIGS. 15 or 16 is desirably used with the main shaft of a pump (not shown) or in the seal of a valve. In FIGS. 15 and 16, reference numeral 6 refers to the stem of the valve, numeral 7 for the body or bonnet of the valve, and numeral 9 a gland retainer.

Now, the operation of such seal device will be described below.

When the packing ring 2 of this invention constructed as illustrated in FIGS. 1 to 14 is set in place inside the stuffing box 8 and then compressed with the gland retainer 9 as shown in FIGS. 15 and 16, the packings 3 formed by spirally winding a ribbon of expanded graphite into a roll and compression molding the roll easily deform in the radial direction and consequently cause the inner and outer peripheral parts thereof to form a tight seal in a gap L between the stem 6 and the bottom part of the stuffing box 8 and prevent the otherwise possible leakage through gap L. At the same time, the annular masses 4 of superposed sheets of expanded graphite obstruct the possible fluid leakage in the axial direction through the interfaces between the component layers of the packings 3. Thus, these packing rings 2 serve as quite excellent seal members for precluding free emission of the fluids being handled in fluid-handling devices.

The packing ring 2 is a composite construction which is formed by integrally combining packings 3 and masses 4, i.e. two members different in texture. The formed packing ring 2 not only exhibits excellent leakproofness as described above but also permits easy handling and simple maintenance owing to such fastness of the composition of component members that the upper and the lower surfaces of the packing ring 2 neither sustain injury nor separate vertically from each other.

This packing ring 2 acquires the optimum sealing property because the density of the packing 3 is set at about 1.3 g/cc and the density of the annular masses 4 is set at a level lower than that of the packing 3, but equal to or higher than about 0.7 g/cc. The packing ring 2, therefore, neither deforms nor fractures in the process of compression molding and the produced packing ring 2 sustains injury only with difficulty.

Further, the possibility that the packing 3 will protrude through the gap L between the bottom part of the stuffing box 8 and the stem 6, the gap M between the gland retainer 9 and the stem 6 and the gap N between the gland retainer 9 and the stuffing box 8 can be precluded by the annular masses 4 of superposed sheets of expanded graphite. Incidentally, the problem of this protrusion in the examples illustrated in FIGS. 15 and 16 can be solved substantially completely by causing the packing 5 formed by braiding a knitting yarn of expanded graphite to be driven into the upper and lower ends of the stuffing box 8, i.e. an empty space for accommodation of packing rings, which are not completely closed.

In producing either the packings 3 or the annular masses 4, tolerance in height and diameter is produced among the packings 3 or annular masses 4. When an annular mass 4 has been incorporated into a packing 3 by compression molding into a packing ring 2, there are some cases, due to tolerance, where a packed part 10 of the packing 3 consequently formed has a projection (not shown) slightly extending in the axial direction of the packing ring 2 and where the annular mass 4 has a moderate slope (not shown). When such packing rings 2 are set in place inside the stuffing box 8 and compressed by the gland retainer 9, such projection and slope are tightened to induce stress in the radial direction, thereby obtaining a large sealing effect.

The seal device 1 illustrated in FIGS. 15 or 16, comprising a total of three superposed packing rings 2 formed of expanded graphite of a relatively small friction coefficient relative to the stem 6 in the shape illustrated in FIGS. 1 and 2 or in the shape illustrated in FIG. 3 and packing rings 5 formed by braiding a knitting yarn of expanded graphite and adjoined one each to opposite ends of the superposed packing rings 2, proves very effective.

To confirm the sealing effect of the seal devices of this invention, three samples, namely a seal device having packing rings disposed as illustrated in FIGS. 15 or 16 (hereinafter referred to as "Product X"), a seal device having conventional packing rings disposed as illustrated in FIG. 18 (hereinafter referred to as "Product Y"), and a seal device simply combining five packing rings obtained by spirally winding a ribbon of expanded graphite into a roll and compression molding the roll as described, though without illustration, in the section titled "Description of the Prior Art" (hereinafter referred to as "Product Z"), were tested for appropriate tightening stress determined in terms of tolerable leakage. The conditions under which the test was carried out and the procedure which was adopted for the test are specified as follows.

Nominal dimension of each of Products X, Y and Z:
24 mm×37 mm×6.5 mm.
Tightening stress:
100 kgf/cm$^2$ at the beginning and successively increased every 50 kgf/cm$^2$.
Fluid sealed:
He gas having a pressure of 52.7 kgf/cm$^2$.
Temperature:
Room temperature (23° C.±1° C.).
Leakage measuring apparatus:
A He gas leakage detector.
Concentration of tolerable leakage of He gas:
80 ppm (not more than 0.001 cc/min in terms of the amount of He gas leaked).
Procedure:
After the tightening stress of a gland retainer was set at 100 kgf/cm$^2$, a valve was loaded with He gas and, ten minutes after such loading, the amount of He gas leaked was measured. This was repeated after the tightening stress was increased by 50 kgf/cm$^2$ per procedure.

Figure 17:
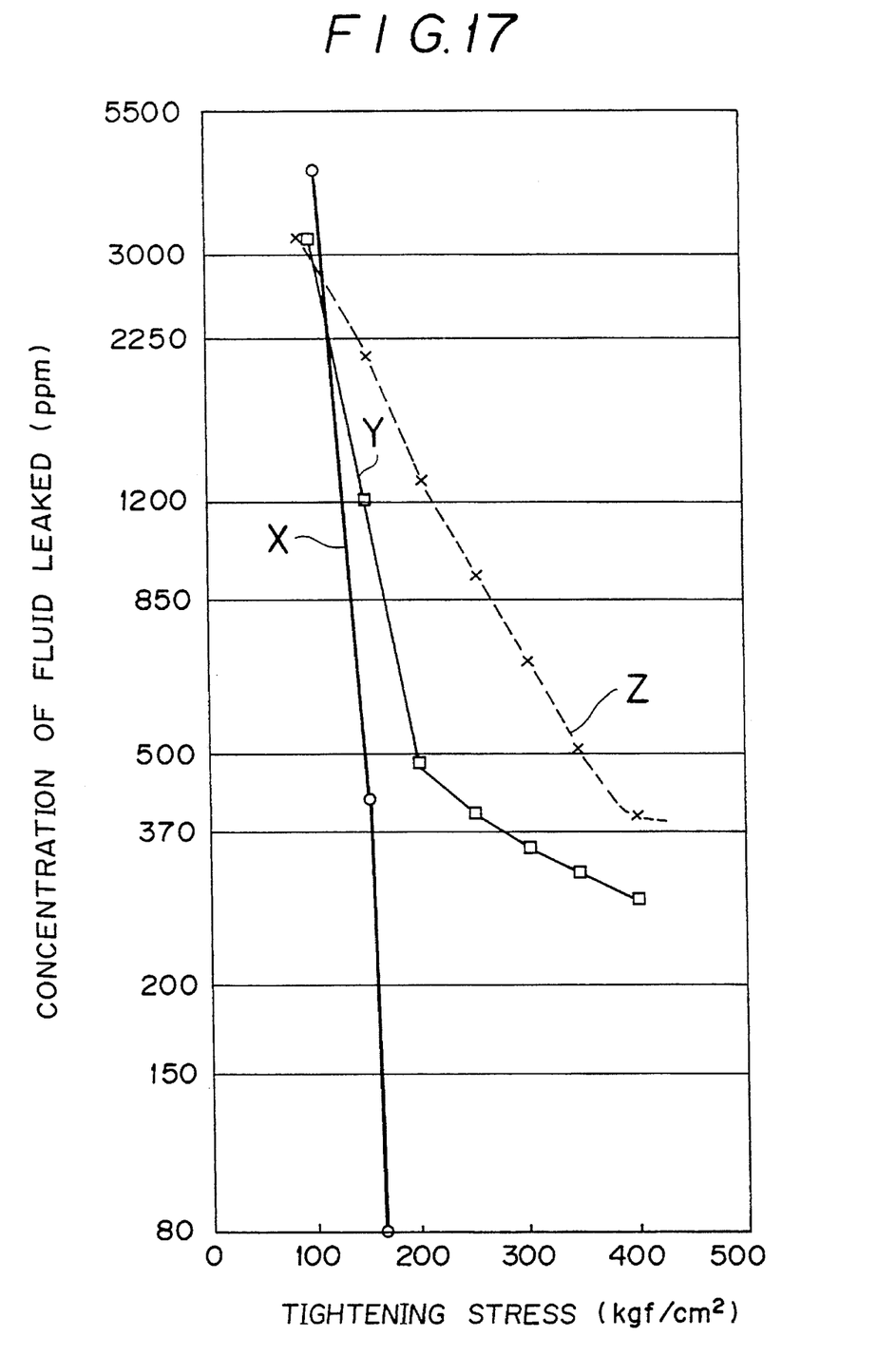
FIG. 17 is a characteristic diagram representing results of a test for comparison between the seal devices produced according to this invention and prior art seal devices.

The results of this test were as shown in the characteristic curves of FIG. 17 plotting the results of the test for appropriate tightening stress. It is clearly noted from the characteristic diagram of FIG. 17 that the appropriate tightening stress of Product X of this invention for the tolerable leakage is as small as 170 kgf/cm$^2$. In contrast, Product Y and Product Z failed to satisfy the tolerable leakage. The numerals indicated along the vertical axis of FIG. 17 represent leakage concentrations (in ppm) reduced from the amounts of leakage by the aspiration method.

As described above, the packing ring of this invention and the seal device using such packing rings of the invention excel in proofness against heat and chemicals and in sealability, completely obstruct leakage of a gas of small molecular weight and a solvent of strong osmosis, preclude protrusion of packing through the gap between a stuffing box and a stem, the gap between a gland retainer and the stuffing box and the gap between the stem and the gland retainer, sustain injury only with difficulty, and allow maintenance to be carried out easily. They can be applied to a wide variety of valves and other similar devices and utilized for infallibly preventing a fluid from leaking and inducing environmental pollution. Thus, this invention brings about such outstanding effects as described above.

What is claimed is:

1. A method for production of a packing ring, said method comprising the steps of:

spirally winding a ribbon of expanded graphite into a roll;

compressing molding said roll into a packing;

disposing an annular mass of superposed sheets of expanded graphite at a position in said packing; and compressing molding a resultant composite within a molding die so as to give rise to at least one packed part having a higher density than said packing in at least one of an inner peripheral part and an outer peripheral part of said packing.

* * * * *

UNITED STATES PATENT AND TRADEMARK OFFICE
CERTIFICATE OF CORRECTION

PATENT NO. : 5,573,253
DATED : November 12, 1996
INVENTOR(S) : Kazumasa NAITOU et al.

It is certified that error appears in the above-indentified patent and that said Letters Patent is hereby corrected as shown below:

On the Abstract Page, under "Related U.S. Application Data", rewrite as:

--[62] Division of Ser. No. 253,354, Jun. 3, 1994, Patent No. 5,522,603.--.

Signed and Sealed this

Fourth Day of March, 1997

*Attest:*

BRUCE LEHMAN

*Attesting Officer*     Commissioner of Patents and Trademarks